United States Patent
Moebius

(10) Patent No.: US 11,303,371 B2
(45) Date of Patent: Apr. 12, 2022

(54) SYSTEM AND METHOD FOR THE INDIVIDUALIZED PROVISION OF BROADCAST RADIO CONTENT IN A VEHICLE

(71) Applicant: Bayerische Motoren Werke Aktiengesellschaft, Munich (DE)

(72) Inventor: Frank Moebius, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/000,630

(22) Filed: Aug. 24, 2020

(65) Prior Publication Data

US 2021/0075529 A1 Mar. 11, 2021

(30) Foreign Application Priority Data

Sep. 5, 2019 (DE) ...................... 10 2019 123 852.8

(51) Int. Cl.
| | |
|---|---|
| *H04H 20/62* | (2008.01) |
| *H04L 29/08* | (2006.01) |
| *H04L 29/06* | (2006.01) |
| *H04L 67/306* | (2022.01) |
| *H04L 65/611* | (2022.01) |
| *B60R 16/023* | (2006.01) |

(52) U.S. Cl.
CPC ......... *H04H 20/62* (2013.01); *H04L 65/4076* (2013.01); *H04L 67/306* (2013.01); *B60R 16/023* (2013.01); *H04H 2201/20* (2013.01)

(58) Field of Classification Search
CPC .. B60R 16/023; H04H 20/62; H04H 2201/20; H04H 60/46; H04H 60/65; H04L 65/4076; H04L 67/12; H04L 67/306

USPC ................. 455/1, 3.06, 403, 90.1; 709/219; 715/716
See application file for complete search history.

(56) References Cited

U.S. PATENT DOCUMENTS

| | | | |
|---|---|---|---|
| 10,972,206 B1 * | 4/2021 | Calvert | H04H 60/27 |
| 10,992,401 B1 * | 4/2021 | Calvert | G06F 16/687 |

(Continued)

FOREIGN PATENT DOCUMENTS

| | | |
|---|---|---|
| DE | 10 2004 037 908 A1 | 3/2006 |
| EP | 2 066 051 A1 | 6/2009 |

OTHER PUBLICATIONS

German-language Office Action issued in German Application No. 10 2019 123 852.8 dated May 14, 2020 (seven (7) pages).

*Primary Examiner* — Tan H Trinh
(74) *Attorney, Agent, or Firm* — Crowell & Moring LLP

(57) ABSTRACT

A system and method provides individualized broadcast radio content in a vehicle. The system has a transmitting unit for transmitting broadcast radio content to the vehicle. The transmitting unit is configured to receive broadcast radio content from a multiplicity of servers, to generate from the received broadcast radio content a selection of broadcast radio content individualized for the vehicle and to convey the individualized selection of broadcast radio content to a receiving unit of the vehicle. The vehicle also has a computing unit configured to generate from the individualized selection of broadcast radio content a broadcast radio content tailored to a current journey of the vehicle and/or a current frame of mind of the vehicle occupants.

10 Claims, 2 Drawing Sheets

(56) References Cited

U.S. PATENT DOCUMENTS

| | | | | |
|---|---|---|---|---|
| 2002/0164973 | A1* | 11/2002 | Janik | H04W 28/06 |
| | | | | 455/403 |
| 2008/0156173 | A1* | 7/2008 | Bauer | G10H 1/0058 |
| | | | | 84/601 |
| 2008/0268768 | A1* | 10/2008 | Brown | H04K 3/43 |
| | | | | 455/1 |
| 2009/0029675 | A1* | 1/2009 | Steinmetz | H04W 48/04 |
| | | | | 455/410 |
| 2010/0056076 | A1* | 3/2010 | Mazzara, Jr. | H04H 60/39 |
| | | | | 455/90.1 |
| 2011/0209062 | A1* | 8/2011 | Faenger | G06F 16/435 |
| | | | | 715/716 |
| 2013/0344799 | A1* | 12/2013 | Cichy | H04H 60/39 |
| | | | | 455/3.06 |
| 2015/0188967 | A1* | 7/2015 | Paulauskas | H04L 67/306 |
| | | | | 709/219 |
| 2015/0193516 | A1* | 7/2015 | Harb | G06Q 30/0251 |
| | | | | 707/625 |
| 2016/0098412 | A1* | 4/2016 | Davidsson | G06F 16/438 |
| | | | | 707/770 |
| 2016/0241645 | A1* | 8/2016 | Sabbaghian | G06Q 30/0265 |
| 2017/0279549 | A1* | 9/2017 | Kocheisen | H04H 20/57 |
| 2018/0033300 | A1* | 2/2018 | Hansen | G08G 1/096844 |
| 2018/0077518 | A1* | 3/2018 | Nguyen | H04W 4/06 |
| 2018/0175953 | A1* | 6/2018 | Rao | H04W 4/46 |
| 2019/0171409 | A1 | 6/2019 | Boulanger et al. | |
| 2020/0228215 | A1* | 7/2020 | Harb | H04N 21/435 |
| 2020/0258306 | A1* | 8/2020 | Forutanpour | G06T 11/00 |

* cited by examiner

SYSTEM AND METHOD FOR THE INDIVIDUALIZED PROVISION OF BROADCAST RADIO CONTENT IN A VEHICLE

CROSS REFERENCE TO RELATED APPLICATION

This application claims priority under 35 U.S.C. § 119 from German Patent Application No. 10 2019 123 852.8, filed Sep. 5, 2019, the entire disclosure of which is herein expressly incorporated by reference.

BACKGROUND AND SUMMARY OF THE INVENTION

The present invention relates to a system and a method for the individualized provision of broadcast radio content in a vehicle.

The reproduction of broadcast radio content in a vehicle is known. Conventional, frequency-modulated radio and digital audio broadcasting (DAB) radio and also Internet radio have the advantage that listeners—without having to actively intervene—can pursue a mixture of music, conversation and news. This broadcast radio content is usually live content and can refer to one region. A disadvantage is that listeners do not have the opportunity to actively influence radio content individually according to current needs. Internet or web radio is also known. In this case, the broadcast radio content is not transmitted as a broadcast, however, but rather follows the client-server principle. A disadvantage of Internet radio is that there is no individualization option. Moreover, Internet radio in a vehicle is not interference-free on account of the heterogeneous mobile radio connectivity. Streaming services provide the option of streaming audio content with enough buffer or of downloading said content in advance. In this case, however, for the purpose of individualization the listener needs to make the effort to select the audio content himself or to switch to a preassembled playlist. Moreover, neither moderation nor news or conversation is usually available.

The object of the invention is to provide a solution that allows broadcast radio content to be provided in a vehicle in individualized fashion and in a manner optimized for a current journey.

This object is achieved according to the invention by the features of the independent claims. Preferred embodiments are the subject of the dependent claims.

The aforementioned object is achieved by a system for providing individualized broadcast radio content in a vehicle, comprising:
- a transmitting unit for transmitting broadcast radio content to the vehicle, wherein the transmitting unit is configured to:
  - receive broadcast radio content from a multiplicity of servers;
  - generate from the received broadcast radio content a selection of broadcast radio content individualized for the vehicle; and
  - convey the individualized selection of broadcast radio content to a receiving unit of the vehicle;
- wherein the vehicle also comprises a computing unit configured to generate from the individualized selection of broadcast radio content a broadcast radio content tailored to a current journey of the vehicle.

The system comprises at least one vehicle. The term vehicle, within the context of the document, covers mobile means of transport used for transporting people (passenger transport), goods (freight transport) or tools (machines or implements). In particular, the term vehicle covers motor vehicles and also motor vehicles that can be driven electrically at least some of the time (electric car, hybrid vehicles).

The vehicle can be controlled by a vehicle driver. Furthermore or alternatively, the vehicle can be a vehicle driving in automated fashion at least some of the time. The term "vehicle driving in automated fashion" or "automated driving" can be understood within the context of the document to mean driving with automated longitudinal or transverse guidance or autonomous driving with automated longitudinal and transverse guidance. Automated driving can be for example driving for a relatively long time on the freeway or driving for a limited time when parking or maneuvering. The term "automated driving" covers automated driving with an arbitrary level of automation. Exemplary levels of automation are assisted, semiautomated, highly automated or fully automated driving. These levels of automation have been defined by the German Federal Highway Research Institute (BASt) (see BASt publication "Forschung kompakt", issue November 2012). Assisted driving involves the driver continually performing the longitudinal or transverse guidance while the system undertakes the respective other function within certain boundaries. Semiautomated driving involves the system undertaking the longitudinal and transverse guidance for a certain period of time and/or in specific situations, with the driver needing to continually monitor the system as in the case of assisted driving. Highly automated driving involves the system undertaking the longitudinal and transverse guidance for a certain period of time without the driver needing to continually monitor the system; however, the driver must be capable of undertaking the vehicle guidance within a certain time. In the case of fully automated driving, the system can manage the driving automatically in all situations for a specific application; this application no longer requires a driver. The aforementioned four levels of automation correspond to SAE levels 1 to 4 of the SAE (Society of Automotive Engineering) J3016 standard. Further, there is also provision for SAE level 5 in SAE J3016 as the highest level of automation, which is not included in the definition from the BASt. SAE level 5 corresponds to driverless driving, wherein the system can manage all situations automatically for the entire journey in the same way as a human driver.

The system comprises a transmitting unit for transmitting broadcast radio content to the vehicle. The transmitting unit is configured to receive broadcast radio content from a multiplicity of servers. Within the context of this document, broadcast radio content comprises streams concerning a specific subject area that are able to be provided by respective servers. Each stream can comprise audio content, video content and other data, e.g. meta data concerning the subject area, concerning a priority, concerning a local reference (which can be ascertained by means of what is known as a geoflag or a geolocation), concerning the content (e.g. title and artist for a song, which are able to be transmitted by means of meta data), etc. Streams comprise up-to-the-minute, virtually live streams. Broadcast radio content also comprises locally stored audio content, video content and other data, e.g. meta data concerning the subject area, concerning a priority, concerning a local reference (which can be ascertained by means of what is known as a geoflag or a geolocation), concerning the content (e.g. title and artist for a song, which are able to be transmitted by means of meta data), etc., which can be received from one or more servers. The subject areas can comprise music, news, breaking news, sport, weather, competitions and any other suitable subject area. This broadcast radio content can be stored in a memory unit. The memory unit may be part of the transmitting unit.

By way of example, broadcast radio content can be provided by servers according to subject areas (e.g. news services, music providers, entertainment, podcasts, market data, weather services, traffic services, organizers or events and/or advertising or latest promotions by various providers), which can be received at the transmitting unit. This content can be provided or conveyed by servers from radio stations, news agencies, music providers/music streaming services, podcasts, events agencies, entertainment programs, weather services, traffic radio services, market data, tour operators and advertising providers.

The transmitting unit is configured to generate or make a selection of broadcast radio content individualized for the vehicle or for a user of the vehicle from the received broadcast radio content.

The transmitting unit is also configured to convey the individualized selection of broadcast radio content to a receiving unit of the vehicle.

The vehicle comprises a receiving unit for receiving the broadcast radio content conveyed by the transmitting unit. Moreover, the vehicle comprises a computing unit configured to generate from the individualized selection of broadcast radio content a broadcast radio content tailored to a current journey of the vehicle.

Advantageously, it is therefore possible to achieve individualization of otherwise unmanipulable broadcast radio content.

Preferably, the generating of the individualized selection of broadcast radio content by the transmitting unit comprises:
  creating an individualized user profile for a driver of the vehicle; and
  generating the individualized selection of broadcast radio content with regard to the user profile.

The transmitting unit can set up and maintain a user profile for each previously registered user of the system. The user profile can comprise personal preferences of the user with regard to broadcast radio content. The personal preferences can be specified by the user during a one-off registration process and continuously updated. A preference specified by the user can be for example preferences with regard to sport, breaking news, a personal musical taste, personal interests, a current situation, future plans, listening habits, information requirements and/or entertainment wishes. In another example, the user can stipulate—possibly by paying a fee—that no advertising content be incorporated in the individualized broadcast radio content.

The individualized selection of broadcast radio content can be generated on the basis of or with regard to the user profile of the or a user of the vehicle.

By way of example, at the start of a journey, the driver of the vehicle can be identified in order to load the appropriate user profile.

This advantageously ensures that broadcast radio content that corresponds to the personal preferences of the user of the vehicle is selected.

Preferably, the generating of the broadcast radio content tailored to a current journey of the vehicle by the computing unit comprises the receiving, from an infotainment system, of individual driving data, wherein the individual driving data are taken into consideration for generating the tailored broadcast radio content.

Within the context of this document, driving data can comprise:
  a current driving time to the next destination, for example obtained from the navigation system of the vehicle and/or a navigation app loaded and executed on a mobile terminal, the mobile terminal being able to be coupled to the vehicle or to the infotainment system of the vehicle by wire or wirelessly; and/or
  a current point of arrival; and/or
  personal appointments, for example read from an appointments app loaded and executed on the mobile terminal; etc.

The current driving time to the next destination can result in the length of time or duration of the tailored broadcast radio content, for example.

The current point of arrival can result in local content of the tailored broadcast radio content that is linked to the point of arrival, for example, such as e.g. information concerning parking options at the airport, information concerning POIs (points of interest) at the point of arrival, etc.

Personal appointments can result in thematic content related to the appointment, for example, latest news concerning a subject related to the appointment, etc.

Advantageously, the user of the vehicle can therefore be provided with broadcast radio content tailored in terms of time and content for the upcoming journey.

Preferably, the generating of the broadcast radio content tailored to a current journey of the vehicle by the computing unit comprises the receiving, from a sensor unit of the vehicle, of sensor data with regard to a current state of the occupants of the vehicle, wherein the received sensor data are taken into consideration for generating the tailored broadcast radio content.

The sensor unit of the vehicle can receive and process sensor data from one or more sensors in the vehicle. The sensors can be for example an interior camera, a voice recognition system, etc. From the sensor data received from the sensors, the sensor unit can ascertain for example a current state of the user or driver of the vehicle and potentially other occupants, such as e.g. tiredness, stress, mood, etc.

The current state of the user of the vehicle and potentially other occupants of the vehicle can be taken into consideration for generating the tailored broadcast radio content. If for example the sensor unit ascertains the current state to be a high level of stress in the driver of the vehicle, soothing broadcast radio content can be incorporated in the tailored broadcast radio content. If for example the current state ascertained is that there is an unhappy child in the vehicle, a happy children's song can be incorporated in the tailored broadcast radio content as broadcast radio content.

Advantageously, it is thus possible for a current state of the occupant of the vehicle to be taken into consideration for generating the tailored broadcast radio content.

The tailored broadcast radio content can be generated by means of suitable algorithms known from the prior art. The algorithms can be artificial intelligence (AI) algorithms. In particular, it is furthermore or alternatively possible for other personal characteristics, such as e.g. a mobility pattern, a purchasing pattern, a familiar situation, spontaneous wishes, a vacation plan and/or cultural and financial interests of the user of the vehicle, to be taken into consideration by the AI algorithms for generating the tailored broadcast radio content.

According to a second aspect, the underlying object is achieved by a method for providing individualized broadcast radio content in a vehicle, comprising:

receiving, at a transmitting unit for transmitting broadcast radio content to the vehicle, broadcast radio content from a multiplicity of servers;

generating, by the transmitting unit, an individualized selection of broadcast radio content from the received broadcast radio content;

conveying the individualized selection of broadcast radio content to a receiving unit of the vehicle; and generating, by a computing unit of the vehicle, a broadcast radio content tailored to a current journey of the vehicle from the individualized selection of broadcast radio content.

Preferably, the generating of the individualized selection of broadcast radio content by the transmitting unit comprises:

creating an individualized user profile for a driver of the vehicle; and generating the individualized selection of broadcast radio content with regard to the user profile.

Preferably, the generating of the broadcast radio content tailored to a current journey of the vehicle by the computing unit comprises the receiving, from an infotainment system, of individual driving data, wherein the individual driving data are taken into consideration for generating the tailored broadcast radio content.

Preferably, the generating of the broadcast radio content tailored to a current journey of the vehicle by the computing unit comprises the receiving, from a sensor unit of the vehicle, of sensor data with regard to a current state of the occupants of the vehicle, wherein the received sensor data are taken into consideration for generating the tailored broadcast radio content.

These and other objects, features and advantages of the present invention will become clear from studying the detailed description of preferred embodiments that follows and the accompanying figures. It is obvious that—although embodiments are described separately—individual features therefrom can be combined to produce additional embodiments.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
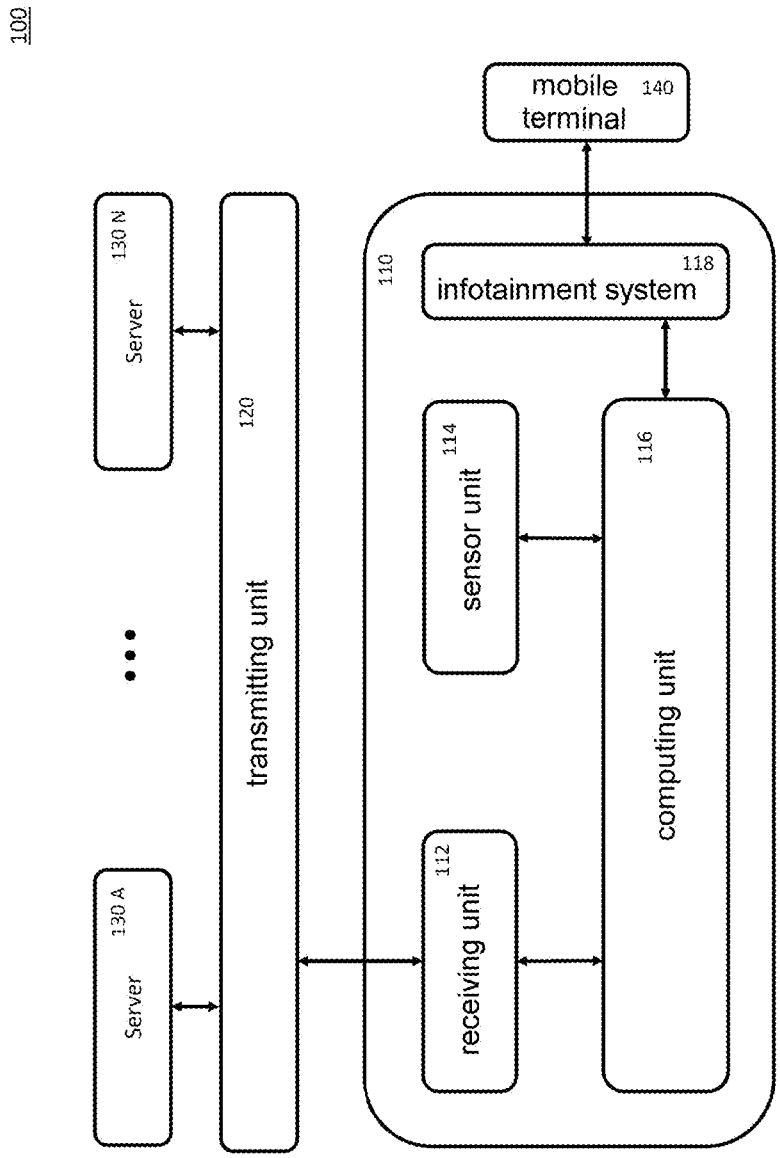
FIG. 1 schematically shows a system for providing individualized broadcast radio content in a vehicle.

FIG. 1 shows a schematic system 100 for providing individualized broadcast radio content in a vehicle 110.

The system 100 comprises at least one vehicle 110 and at least one transmitting unit 120 for transmitting broadcast radio content to the vehicle 110. The transmitting unit 120 is configured to receive broadcast radio content from a multiplicity of servers 130A ... 130N.

By way of example, broadcast radio content can be provided by the servers 130A ... 130N according to subject areas (e.g. news services, music providers, entertainment, podcasts, market data, weather services, traffic services, organizers or events and/or advertising or latest promotions by various providers), which can be received at the transmitting unit. This content can be conveyed by servers 130A ... 130N from radio stations, news agencies, music providers/music streaming services, podcasts, events agencies, entertainment programs, weather services, traffic radio services, market data, tour operators and advertising providers to the transmitting unit 120.

The transmitting unit 120 is configured to generate or make a selection of broadcast radio content individualized for the vehicle 110 or a user (not shown) of the vehicle 110 from the received broadcast radio content.

The generating of the individualized selection of broadcast radio content by the transmitting unit 120 can comprise:

creating an individualized user profile for a driver of the vehicle; and generating the individualized selection of broadcast radio content with regard to the user profile.

The transmitting unit 120 can set up and maintain a user profile for each (previously registered) user of the system 100. The user profile can comprise personal preferences of the user with regard to broadcast radio content. The personal preferences can be specified by the user during a one-off registration process and continuously updated. A preference specified by the user can be for example preferences with regard to sport, breaking news, a personal musical taste, personal interests, a current situation, future plans, listening habits, information requirements and/or entertainment wishes, etc. In another example, the user can stipulate—possibly by paying a fee—that no advertising content be incorporated in the individualized broadcast radio content.

The individualized selection of broadcast radio content can be generated on the basis of or with regard to the user profile of the or a user of the vehicle 110. By way of example, at the start of a journey, the driver of the vehicle 110 can be identified in a manner known from the prior art in order to load the appropriate user profile. In another example, user profiles can be loaded for all users who are in the vehicle.

This advantageously ensures that broadcast radio content that corresponds to the personal preferences of the user or users of the vehicle 110 is selected.

The transmitting unit 120 is also configured to convey the individualized selection of broadcast radio content to a receiving unit 112 of the vehicle 110.

The vehicle 110 comprises a receiving unit 112 for receiving the broadcast radio content conveyed by the transmitting unit 120. Moreover, the vehicle 110 comprises a computing unit 116 configured to generate from the individualized selection of broadcast radio content a broadcast radio content tailored to a current journey of the vehicle 110.

The generating of the broadcast radio content tailored to a current journey of the vehicle 110 by the computing unit can comprise the receiving, from an infotainment system 118 of the vehicle 110, of individual driving data, wherein the individual driving data are taken into consideration for generating the tailored broadcast radio content.

The driving data can comprise for example:

a current driving time to the next destination, for example obtained from the navigation system of the vehicle 110 and/or a navigation app or navigation application loaded and executed on a mobile terminal 140, the mobile terminal 140 being able to be coupled to the vehicle or to the infotainment system 118 of the vehicle 110 by wire or wirelessly; and/or a current point of arrival; and/or personal appointments, for example read from an appointments app loaded and executed on the mobile terminal 140;

etc.

The current driving time to the next destination can result in the length of time or duration of the tailored broadcast radio content, for example.

The current point of arrival can result in local content of the tailored broadcast radio content that is linked to the point of arrival, for example, such as e.g. information concerning parking options at the airport, information concerning POIs (points of interest) at the point of arrival, etc.

Personal appointments can result in thematic content related to the appointment, for example, e.g. latest news concerning a subject related to the appointment, etc.

Advantageously, the user of the vehicle 110 can therefore be provided with broadcast radio content tailored in terms of time and content for the upcoming journey.

Furthermore or alternatively, the generating of the broadcast radio content tailored to a current journey of the vehicle 110 by the computing unit 116 can comprise the receiving, from a sensor unit 114 of the vehicle 110, of sensor data with regard to a current state of the occupants of the vehicle 110, wherein the received sensor data are taken into consideration for generating the tailored broadcast radio content.

The sensor unit 114 of the vehicle can receive and process sensor data from one or more sensors (not shown) in the vehicle 110. The sensors can be for example an interior camera, a voice recognition system, etc. From the sensor data received from the sensors, the sensor unit 114 can ascertain for example a current state of the user or driver of the vehicle 110 and potentially other occupants. The current state can cover for example tiredness, stress, a mood, etc.

The current state of the user of the vehicle 110 and potentially other occupants of the vehicle 110 can be taken into consideration for generating the tailored broadcast radio content. If for example the sensor unit 114 ascertains the current state to be a high level of stress in the driver of the vehicle 110, soothing broadcast radio content can be incorporated in the tailored broadcast radio content. If for example the current state ascertained is that there is an unhappy child in the vehicle 110, a happy children's song can be incorporated in the tailored broadcast radio content as broadcast radio content.

Advantageously, it is thus possible for a current state of the occupant(s) of the vehicle 110 to be taken into consideration for generating the tailored broadcast radio content.

The tailored broadcast radio content can be generated by means of suitable algorithms known from the prior art. The algorithms can be artificial intelligence (AI) algorithms. In particular, it is furthermore or alternatively possible for other personal characteristics, such as e.g. a mobility pattern, a purchasing pattern, a familiar situation, spontaneous wishes, a vacation plan and/or cultural and financial interests of the user of the vehicle 110, to be taken into consideration by the AI algorithms for generating the tailored broadcast radio content.

Figure 2:
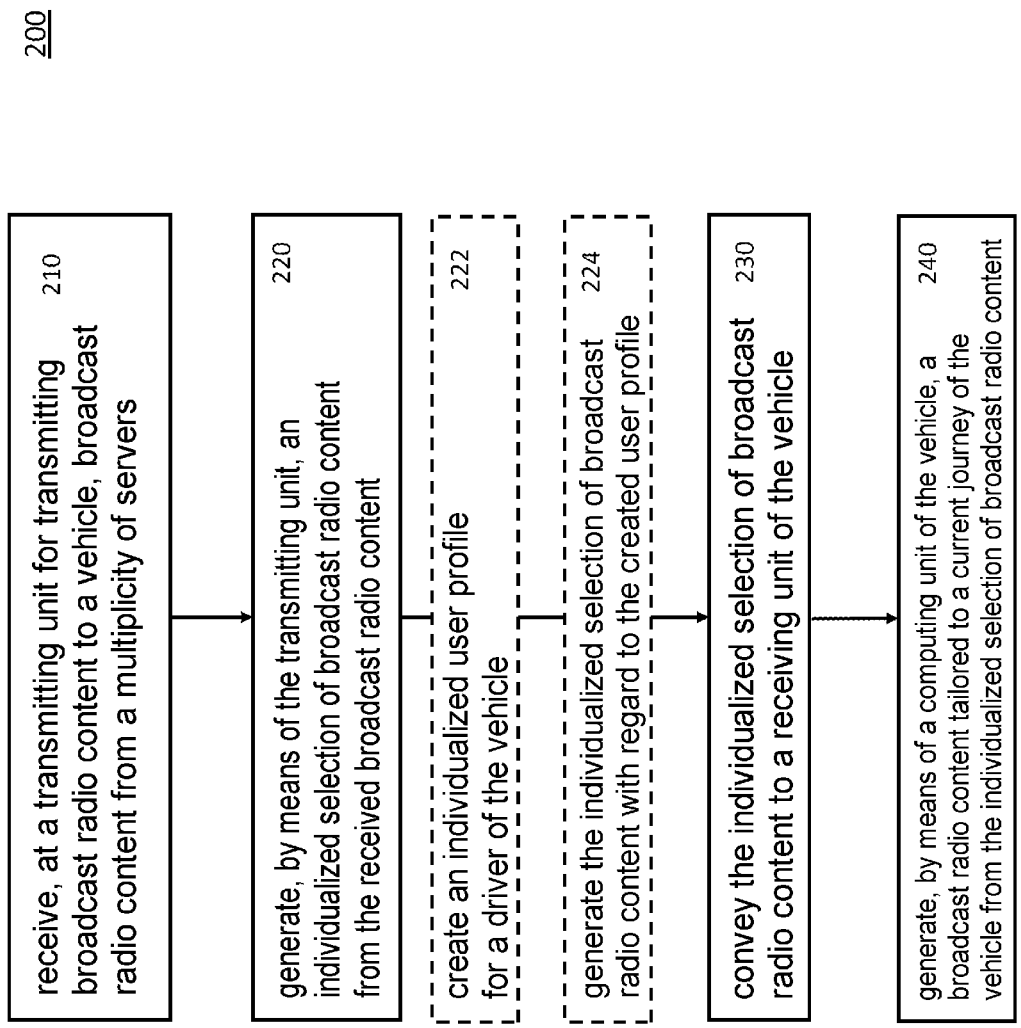
FIG. 2 shows an exemplary method for providing individualized broadcast radio content in a vehicle.

FIG. 2 shows a method 200 for providing individualized broadcast radio content in a vehicle 100, which can be carried out by a system 100 as described with reference to FIG. 1.

The method 200 comprises:

receiving 210, at a transmitting unit 120 for transmitting broadcast radio content to the vehicle 110, broadcast radio content from a multiplicity of servers 130 A . . . 130N;

generating 220, by way of the transmitting unit 120, an individualized selection of broadcast radio content from the received broadcast radio content;

conveying 230 the individualized selection of broadcast radio content to a receiving unit 112 of the vehicle 110; and generating 240, by a computing unit 116 of the vehicle 110, a broadcast radio content tailored to a current journey of the vehicle 110 from the individualized selection of broadcast radio content.

The generating 220 of the individualized selection of broadcast radio content by the transmitting unit 120 can comprise:

creating 222 an individualized user profile for a driver of the vehicle 110; and generating 224 the individualized selection of broadcast radio content with regard to the user profile.

The generating 240 of the broadcast radio content tailored to a current journey of the vehicle 110 by the computing unit 116 can comprise the receiving, from an infotainment system 118, of individual driving data, wherein the individual driving data are taken into consideration for generating 240 the tailored broadcast radio content.

The generating 240 of the broadcast radio content tailored to a current journey of the vehicle 110 by the computing unit 116 can comprise the receiving, from a sensor unit 114 of the vehicle, of sensor data with regard to a current state of the occupants of the vehicle, wherein the received sensor data are taken into consideration for generating 240 the tailored broadcast radio content.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for providing individualized broadcast radio content in a vehicle, comprising:

a transmitting unit for transmitting broadcast radio content to the vehicle, wherein the transmitting unit is configured to:

receive broadcast radio content from a multiplicity of servers;

generate from the received broadcast radio content a selection of broadcast radio content individualized for the vehicle; and convey the individualized selection of broadcast radio content to a receiving unit of the vehicle; and a computing unit of the vehicle configured to generate, from the individualized selection of broadcast radio content, a broadcast radio content tailored to a current journey of the vehicle, wherein:

the computing unit is further configured to generate the broadcast radio content tailored to a current journey of the vehicle by receiving, from an infotainment system, individual driving data, the individual driving data are taken into consideration for generating the tailored broadcast radio content, and the individual driving data comprise a current driving time to a next destination.

2. The system according to claim 1, wherein the transmitting unit is further configured to generate the individualized selection of broadcast radio content by:
creating an individualized user profile for a driver of the vehicle; and
generating the individualized selection of broadcast radio content with regard to the user profile.

3. The system according to claim 1, wherein the computing unit is further configured to generate the broadcast radio content tailored to the current journey of the vehicle by:
receiving, from a sensor unit of the vehicle, sensor data with regard to a current state of the occupants of the vehicle, wherein the received sensor data are taken into consideration for generating the tailored broadcast radio content.

4. The system according to claim 1, wherein the individual driving data further comprise a current point of arrival.

5. The system according to claim 1, wherein the individual driving data further comprise a personal appointment.

6. A method for providing individualized broadcast radio content in a vehicle, comprising:
receiving, at a transmitting unit for transmitting broadcast radio content to the vehicle, broadcast radio content from a multiplicity of servers;
generating, by the transmitting unit, an individualized selection of broadcast radio content from the received broadcast radio content;
conveying the individualized selection of broadcast radio content to a receiving unit of the vehicle; and
generating, by a computing unit of the vehicle, a broadcast radio content tailored to a current journey of the vehicle from the individualized selection of broadcast radio content wherein:
the generating of the broadcast radio content tailored to a current journey of the vehicle by the computing unit comprises receiving, from an infotainment system, individual driving data,
the individual driving data are taken into consideration for generating the tailored broadcast radio content, and
the individual driving data comprise a current driving time to a next destination.

7. The method according to claim 6, wherein the generating of the individualized selection of broadcast radio content by the transmitting unit comprises:
creating an individualized user profile for a driver of the vehicle; and
generating the individualized selection of broadcast radio content with regard to the user profile.

8. The method according to claim 6, wherein the generating of the broadcast radio content tailored to the current journey of the vehicle by the computing unit further comprises:
receiving, from a sensor unit of the vehicle, sensor data with regard to a current state of the occupants of the vehicle, wherein the received sensor data are taken into consideration for generating the tailored broadcast radio content.

9. The method according to claim 6, wherein the individual driving data further comprise a current point of arrival.

10. The method according to claim 6, wherein the individual driving data further comprise a personal appointment.

\* \* \* \* \*